(12) United States Patent
Kang et al.

(10) Patent No.: US 7,920,064 B2
(45) Date of Patent: Apr. 5, 2011

(54) RADIO FREQUENCY IDENTIFICATION TAG CAPABLE OF STORING AND RESTORING FLAG DATA

(75) Inventors: Hee Bok Kang, Chungcheongbuk-do (KR); Suk Kyoung Hong, Gyeonggi-do (KR)

(73) Assignee: Hynix Semiconductor Inc., Kyoungki-do (KR)

( * ) Notice: Subject to any disclaimer, the term of this patent is extended or adjusted under 35 U.S.C. 154(b) by 357 days.

(21) Appl. No.: 12/146,544

(22) Filed: Jun. 26, 2008

(65) Prior Publication Data
US 2009/0167532 A1    Jul. 2, 2009

(30) Foreign Application Priority Data
Dec. 31, 2007 (KR) .................. 10-2007-0141519

(51) Int. Cl.
*G08B 13/14* (2006.01)
(52) U.S. Cl. .................. 340/572.1; 340/10.1; 365/145; 365/191; 365/192
(58) Field of Classification Search ............... 340/572.1, 340/10.1
See application file for complete search history.

(56) References Cited

U.S. PATENT DOCUMENTS

| | | | |
|---|---|---|---|
| 6,809,952 B2* | 10/2004 | Masui | 365/145 |
| 2005/0078502 A1 | 4/2005 | Kang | |
| 2006/0268631 A1 | 11/2006 | Kang et al. | |
| 2007/0018821 A1* | 1/2007 | Kang et al. | 340/572.1 |
| 2007/0132557 A1* | 6/2007 | Kang et al. | 340/10.34 |
| 2007/0290706 A1 | 12/2007 | Kang | |
| 2009/0015386 A1 | 1/2009 | Kang et al. | |

FOREIGN PATENT DOCUMENTS
KR    1020030024223 A    3/2003
* cited by examiner

*Primary Examiner* — George A Bugg
*Assistant Examiner* — Kerri McNally
(74) *Attorney, Agent, or Firm* — Ladas & Parry LLP

(57) ABSTRACT

A RFID tag capable of storing and restoring flag data is described. The RFID tag includes an analog block for generating a driving power using a radio frequency signal received through an antenna. The driving power is used to store the flag data. A digital block is operated using the generated driving power and processes RF data that is transmitted and received via the analog block in order to store the flag data in the analog block. A memory block reads and writes data to a nonvolatile ferroelectric capacitor depending on a control signal from the digital block. The analog block supplies the flag data to the digital block during an activation time period of a power-on reset signal.

20 Claims, 13 Drawing Sheets ary Identification (RFID) tag, and more particularly, to a technology for storing flag data representing a data processing state for a given time and restoring the flag data without an initialization process when power is temporarily turned off and then on while storing the flag data.

RADIO FREQUENCY IDENTIFICATION TAG CAPABLE OF STORING AND RESTORING FLAG DATA

CROSS-REFERENCE TO RELATED APPLICATIONS

The present application claims priority to Korean Patent Application No. 10-2007-0141519, filed on Dec. 31, 2007, which is incorporated herein by reference in its entirety.

BACKGROUND OF THE INVENTION

The present invention relates generally to a Radio Frequency Identification (RFID) tag, and more particularly, to a technology for storing flag data representing a data processing state for a given time and restoring the flag data without an initialization process when power is temporarily turned off and then on while storing the flag data.

Generally, nonvolatile ferroelectric memory, i.e., Ferroelectric Random Access Memory (FeRAM), has a data processing speed similar to that of Dynamic Random Access Memory (DRAM). The FeRAM has been spotlighted as a next generation memory device whose data is conserved even after power is turned off.

An FeRAM device having a structure similar to that of a DRAM device includes capacitors made of a ferroelectric substance and has a high residual polarization allowing for data retention even after power is no longer supplied to the memory device.

An RFID device includes a reader automatically recognizing an object that is equipped with an electric tag using a radio frequency and reading information on the electric tag. The RFID device has been widely used in inventory control, supply chain management, and factory automation due to its fast recognition speed and large data storage capacity.

The RFID device includes a RFID reader and a RFID tag. The RFID reader includes an internal or external antenna. The antenna outputs an activating signal to form an electromagnetic field, i.e., a RF field. When a RFID tag enters the generated RF field, the RFID tag generates driving power for the RFID tag using the activating signal received from the antenna of the RFID reader and then transmits data stored in the tag to the RFID reader.

When there are a plurality of RFID tags in a read range of the RFID reader, i.e., within the generated RF field, the RFID reader is required to judge a data processing state for each RFID tag.

A conventional RFID tag receives a RF signal form the RFID reader to generate a driving power. When a power source is temporarily disconnected due to a change in location of the RFID tag or a change in the state of the RF signal, data (flag data) representing a current data processing state may be lost.

When this happens, it is impossible to judge which of the RFID tags is communicating with the RFID reader. When the power source is turned off and then on, the RFID tag initializes and processes data from the beginning. As a result, data processing speeds may be degraded and different new data may be processed even though the previous data processing was not finished.

SUMMARY OF THE INVENTION

The present invention includes a RFID tag restoring flag data when a power source is temporarily turned off and then on to perform a stable and fast data processing operation.

According to an embodiment of the present invention, a RFID tag comprises: an analog block generating a driving power using a radio frequency signal received through an antenna and using the driving power to store flag data; a digital block receiving the driving power to operate and processing radio frequency data transmitted and received through the analog block to store the flag data in the analog block; and a memory block reading and writing data to a nonvolatile ferroelectric capacitor according to a control signal from the digital block. The analog block supplies the flag data to the digital block when a power-on reset signal is activated for a given period of time.

DESCRIPTION OF SPECIFIC EMBODIMENTS

Figure 1:
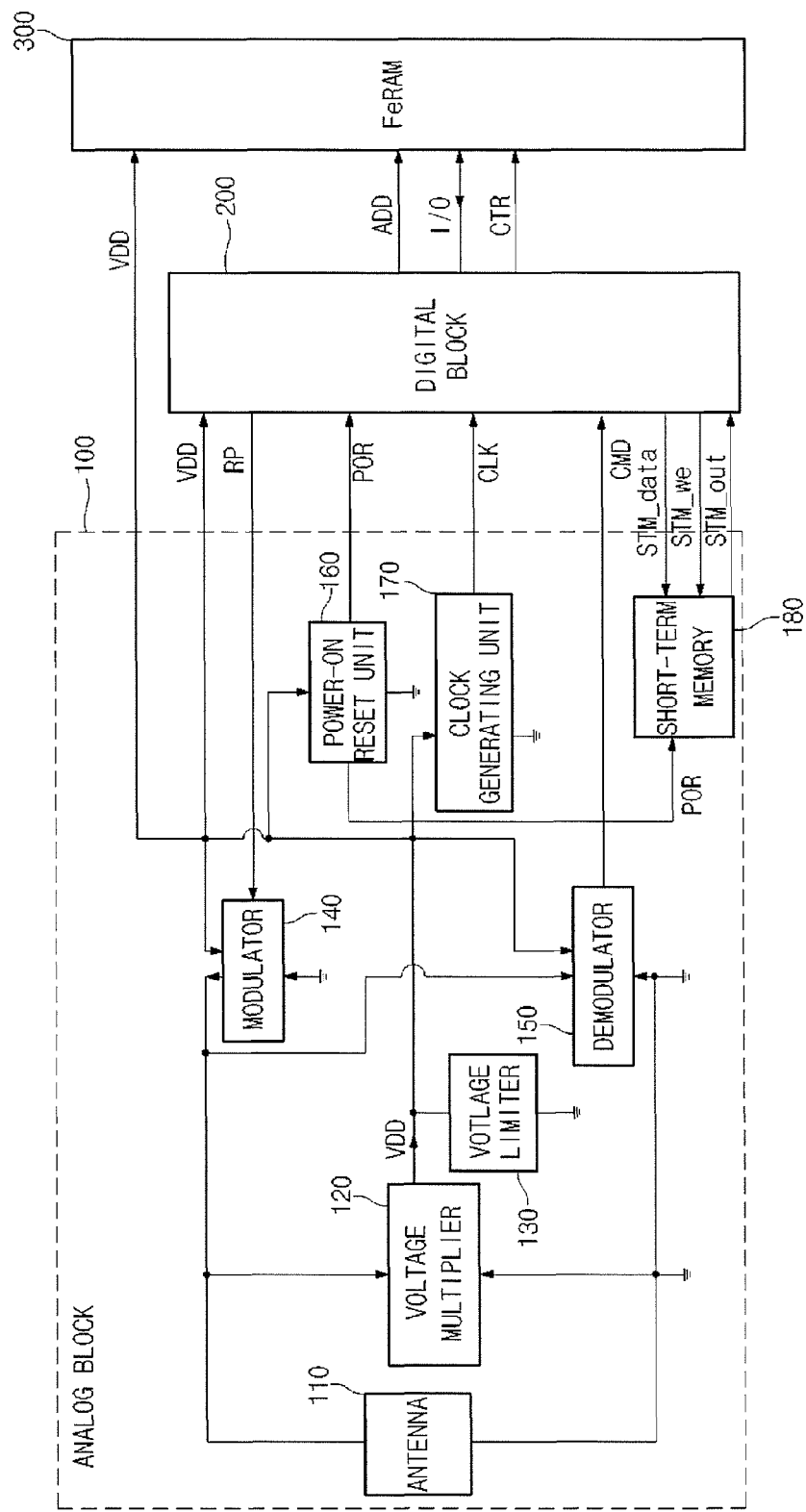
FIG. 1 is a diagram showing a RFID tag according to an embodiment of the present invention.

FIG. 1 is a diagram showing a RFID device according to an embodiment of the present invention.

The RFID device comprises an analog block 100, a digital block 200, and a memory block 300.

The analog block 100 transmits and receives a radio frequency (RF) signal with an external communicator through an antenna 110 and generates a power voltage VDD, i.e., a driving power voltage for driving the RFID tag using the received RF signal. The analog block 100 in combination with the digital block 200 stores flag data that represents a data processing state for a given period of time and provides the flag data to the digital block 200. When power to the RFID device is temporarily turned off and then on while the flag data is stored, the analog block 100 restores the flag data and supplies the data to the digital block 200.

The analog block 100 includes an antenna 110, a voltage multiplier 120, a voltage limiter 130, a modulator 140, a demodulator 150, a power-on reset unit 160, a clock generating unit 170, and short-term memory 180.

The antenna 110 transmits and receives the RF signal using an external reader or writer. The voltage multiplier 120 generates a power voltage VDD for driving the RFID device using the RF signal received from the antenna 110.

The voltage limiter 130 limits an output voltage of the voltage multiplier 120 at a predetermined power voltage VDD level. The modulator 140 modulates a response signal RP outputted from the digital block 200 and transmits the response signal RP to the antenna 110.

The demodulator 150 detects an operating command from the RF signal received at the antenna 110 and outputs a command signal CMD to the digital block 200. The power-on reset unit 160 senses the power voltage VDD and outputs a power-on reset signal POR to the digital block 200 to control a reset operation.

The clock generating unit 170 generates a clock signal CLK and outputs the clock signal CLK to the digital block 200 to control the operation of the digital block 200 according to the power voltage VDD.

The short-term memory 180 stores a short-term data signal STM_data of the flag data received from the digital block 200. The short-term memory 180 restores the flag data and supplies the data to the digital block 200 when power is temporarily turned off and then on while the flag data is stored.

That is, while power is supplied normally to the RFID device, a short-term data write signal STM_we for storing the flag data is outputted to the short-term memory 180 along with the short-term data signal STM_data (write mode). The short-term memory 180 outputs a short-term data output signal STM_out for the flag data to the digital block 200 while storing the flag data for a given period of time.

If the power supply is temporarily turned off and then on (restoration mode) while the flag data is stored in the short-term memory 180, the short-term memory 180 restores the flag data before the power is turned off and supplies the data to the digital block 200. As a result, the digital block 200 may process data without initializing even though the power supply is temporarily turned off and then on.

The digital block 200 operates in response to the power voltage VDD received from the analog block 100, the power-on reset signal POR, and the clock signal CLK. The digital block 200 processes RF data (command signal CMD, response signal RP) transmitted and received using the external reader or writer through the analog block 100. The digital block 200 temporarily stores the flag data in the short-term memory 180 of the analog block 100.

The memory block 300 includes a plurality of memory cells each of which having a nonvolatile ferroelectric capacitor for storing the RF data from the digital block 200.

Figure 2:
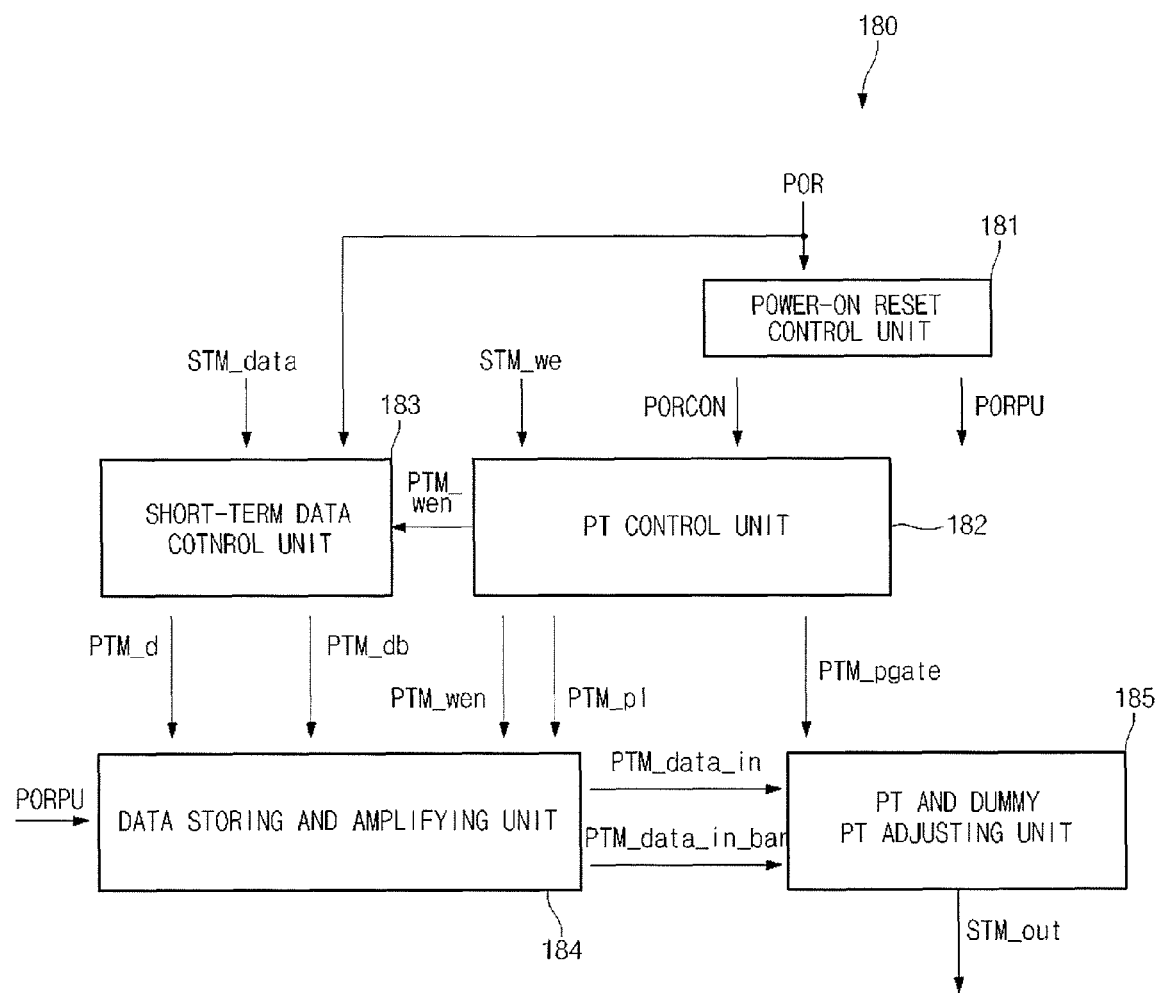
FIG. 2 is a diagram showing a short-term memory according to an embodiment of the present invention.

FIG. 2 is a diagram illustrating the short-term memory 180 according to an embodiment of the present invention.

The short-term memory 180 includes a power-on reset (POR) control unit 181, a persistent time (PT) control unit 182, a short-term data control unit 183, a data storing and amplifying unit 184, and a PT and dummy PT adjusting unit 185.

The POR control unit 181 outputs a power-on reset control signal PORCON and a power-on reset pull-up signal PORPU for restoring the flag data when the power-on reset signal POR is generated.

The PT control unit 182 controls when the flag data is stored in the data storing and amplifying unit 184 according to the power-on reset control signal PORCON and the short-term data write signal STM_we. The PT control unit 182 stores and restores the flag data and generates signals PTM_wen, PTM_pl and PTM_pgate for outputting the data to the digital block 200.

That is, when the flag data is written, the PT control unit 182 generates the delayed write signal PTM_wen which has a pulse width corresponding to a given time for activation of the short-term data write signal STM_we. The PT control unit 182 supplies the flag data to the data storing and amplifying unit 184.

The PT control unit 182 outputs the plate signal PTM_pl and gate signal PTM_pgate during activation of the short-term data write signal STM_we or when power is turned off and then on which activates the power-on reset control signal PORCON.

The plate signal PTM_pl is a signal for storing or restoring the flag data stored in the data storing and amplifying unit 184. The gate signal PTM_pgate is a signal for supplying the flag data to the digital block 200.

When the flag data is written, the short-term data control unit 183 converts the short-term data signal STM_data received from the digital block 200 into delayed data signals PTM_d, PTM_db according to the delayed write signal PTM_wen to output the converted signals to the data storing and amplifying unit 184.

In a write mode, the data storing and amplifying unit 184 stores the flag data according to the delayed data signals PTM_d, PTM_db, the delay write signal PTM_wen, and the plate signal PTM_pl. In a restoration mode, the data storing and amplifying unit 184 amplifies the flag data according to the plate signal PTM_pl and the power-on reset pull-up signal PORPU.

When the delayed write signal PTM_wen and the plate signal PTM_pl are activated, the data storing amplifying unit 184 stores the flag data in a ferroelectric capacitor for a given period of time according to the delayed data signals PTM_d, PTM_db outputted from the short-term data control unit 183. Simultaneously, the data storing and amplifying unit 184 outputs the data to the PT and dummy PT adjusting unit 185.

The data storing and amplifying unit 184 reads and amplifies the flag data stored in the ferroelectric capacitor and outputs the data to the PT and dummy PT adjusting unit 185 when power is turned off and then on activating the power-on reset pull-up signal PORPU and the plate signal PTM_pl.

The PT and dummy PT adjusting unit 185 outputs the short-term data output signal STM_out to the digital block 200. The short-term data output signal STM_out is obtained by delaying output signals, i.e., delayed data input signals PTM_data_in and PTM_data_in_bar, of the data storing and amplifying unit 184.

The PT and dummy PT adjusting unit 185 includes a PT adjusting unit and a dummy PT adjusting unit. The PT adjusting unit delays the delayed data input signal PTM_data_in for a given period of time and outputs the short-term data output signal STM_out. The dummy PT adjusting unit delays and inverts the delayed data input signal PTM_data_in_bar and outputs the short-term data output signal STM_out when there is an error in the PT adjusting unit.

Figure 3:
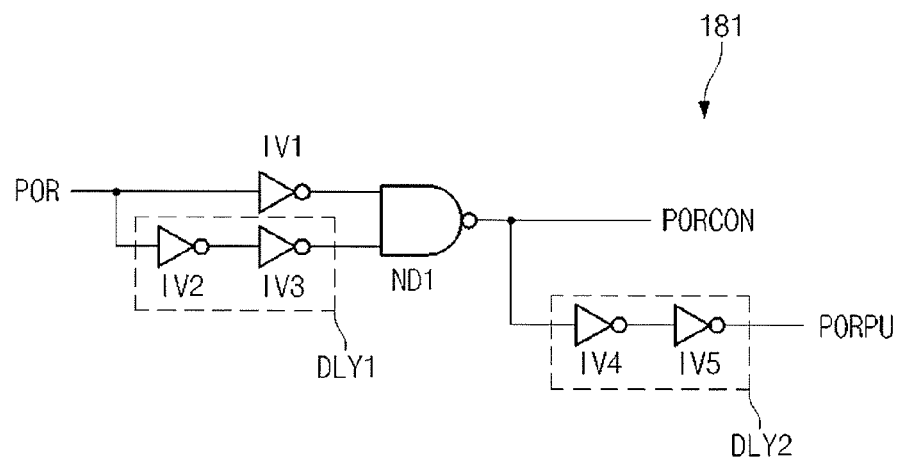
FIG. 3 is a diagram showing a POR control unit of FIG. 2.
Figure 3:
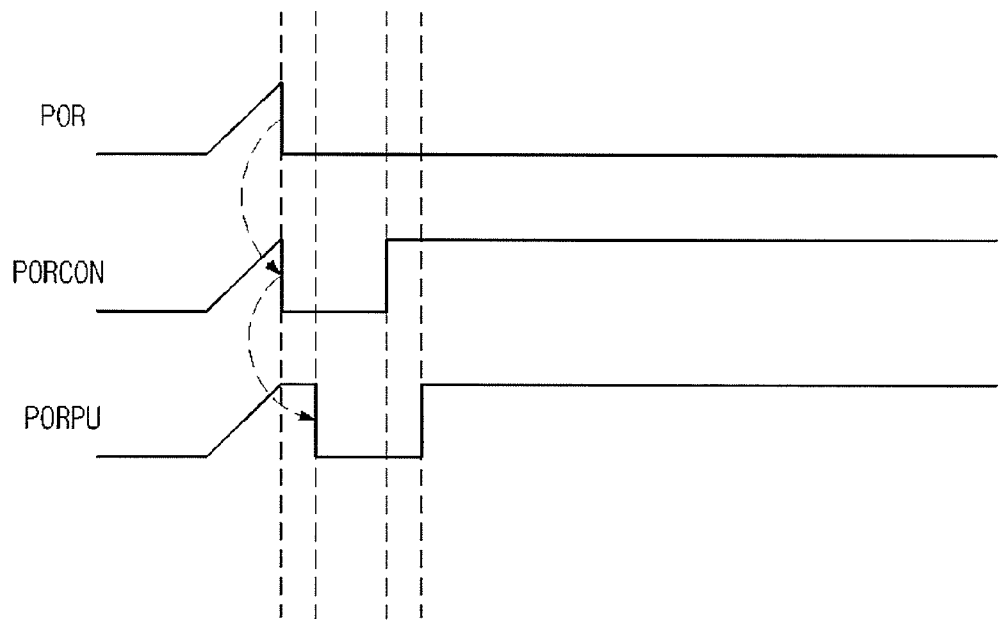

FIG. 3 is a diagram showing the POR control unit 181 of FIG. 2.

The POR control unit 181 includes an inverter IV1, delay units DLY1, DLY2, and a NAND gate ND1. The inverter IV1 inverts the power-on reset signal POR. The delay unit DLY1 delays the power-on reset signal POR. The NAND gate ND1 performs a NAND operation on output signals of the inverter IV1 and the delay unit DLY1 and outputs the power-on reset control signal PORCON. The delay unit DLY2 delays the power-on reset control signal PORCON and outputs the power-on reset pull-up signal PORPU. The delay unit DLY1 includes serially connected inverters IV2, IV3. The delay unit DLY2 includes serially connected inverters IV4, IV5.

Hereinafter, the operation of the POR control unit 181 is described with reference to FIG. 3.

An output signal of the delay unit DLY1 according to a change in the power-on reset signal POR is inputted to the NAND gate ND1 later than the output of the inverter IV1 inputted to the NAND gate ND1. Even when power is turned off and then on which transits the power-on reset signal POR to a low level, the power-on reset control signal PORCON has a low level pulse width corresponding to its time difference. The power-on reset control signal PORCON is delayed by the delay unit DLY2 for a given period of time so that the power-on reset pull-up signal PORPU is generated and outputted.

Figure 4:
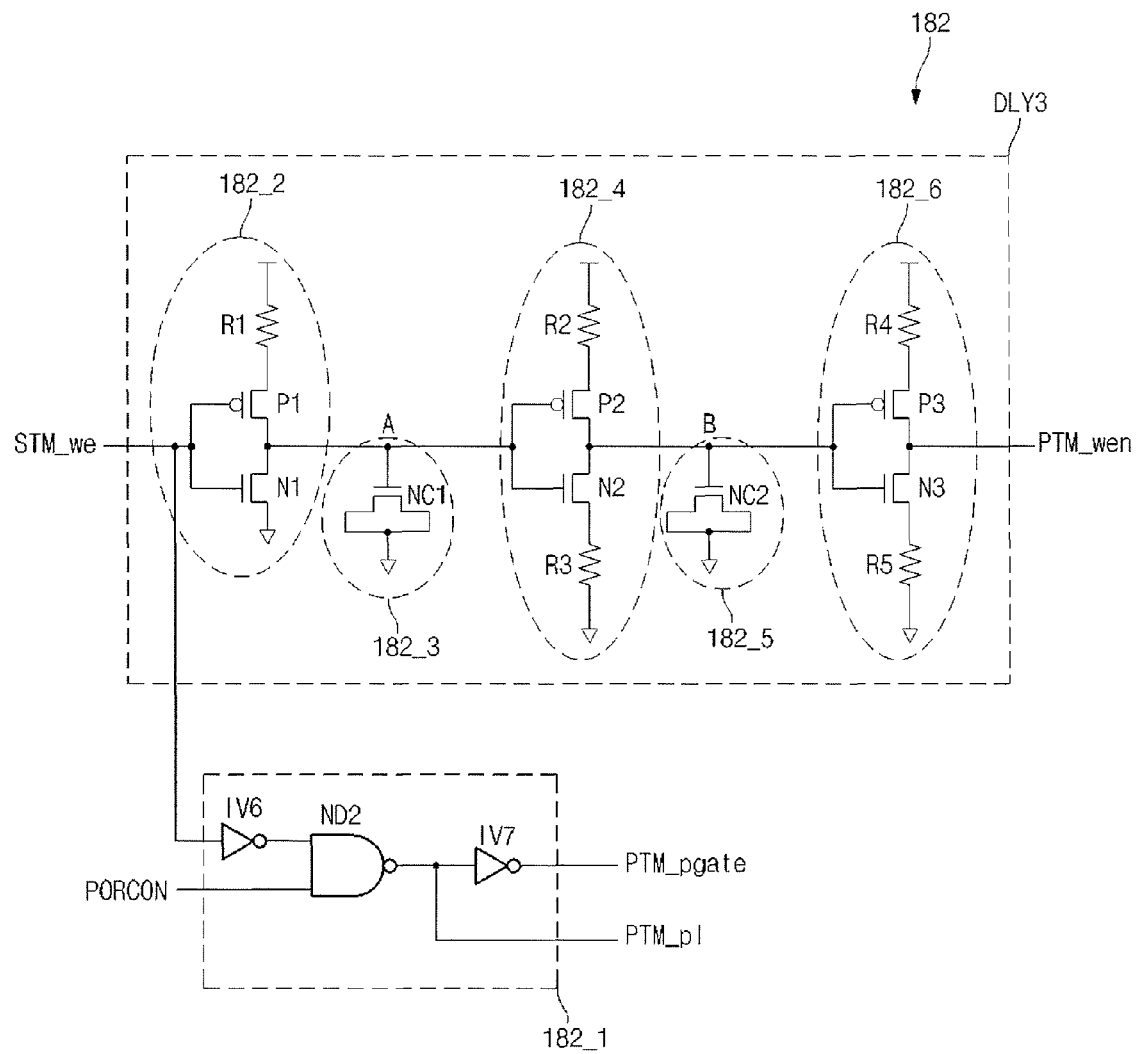
FIG. 4 is a diagram showing a PT control unit of FIG. 2.

FIG. 4 is a diagram showing the PT control unit 182 of FIG. 2.

The PT control unit 182 includes a short-term write delay unit DLY3 and a storing and restoring control unit 182_1.

The short-term write delay unit DLY3 delays and inverts the short-term data write signal STM_we and outputs the delayed write signal PTM_wen. The short-term write delay unit DLY3 includes a pull-up delay driving unit 182_2, a pull-up delay capacity unit 182_3, a delay driving unit 182_4, a delay capacity unit 182_5, and a delay driving unit 182_6.

The pull-up delay driving unit 182_2 inverts and pulls up the short-term data write signal STM_we. The pull-up delay driving unit 182_2 includes a resistor R1 serially connected between a power voltage terminal and a ground voltage terminal, a PMOS transistor P1, and a NMOS transistor N1. The gates of the PMOS transistor P1 and NMOS transistor N1 are commonly connected to an input terminal and receive the short-term data write signal STM_we.

The pull-up delay capacity unit 182_3 delays an output signal of the pull-up delay driving unit 182_2 for a given period of time and transmits the output signal to the delay driving unit 182_4.

That is, the pull-up delay capacity unit 182_3 is charged via a power voltage supplied through the PMOS transistor P1 when the short-term data write signal STM_we is at a low level. In the pull-up delay capacity unit 182_3, a voltage charged through the NMOS transistor N1 is gradually discharged when the short-term data write signal STM_we changes to a high level. The pull-up delay capacity unit 182_3 maintains a voltage of a node A at a high level for a given period of time to prevent immediately transmitting the output signal of the pull-up delay driving unit 182_2 to the delay driving unit 182_4.

The pull-up delay capacity unit 182_3 includes a NMOS capacitor NC1 connected between the ground voltage terminal and the output terminal (node A) of the pull-up delay driving unit 182_2. The delay time for an output voltage of the pull-up delay driving unit 182_2 is determined by a capacity value of the NMOS capacitor NC1.

The delay driving unit 182_4 inverts the output signal of the pull-up delay driving unit 182_2 that is delayed by the pull-up delay capacity unit 182_3. That is, when charges in the NMOS capacitor NC1 of the pull-up delay capacity unit 182_3 are sufficiently discharged to lower its output voltage to a low level, the delay driving unit 182_4 inverts the output voltage.

The delay driving unit 182_4 includes a resistor R2 serially connected between the power voltage terminal and the ground voltage terminal, a PMOS transistor P2, a NMOS transistor N2, and a resistor R3. The gates of the PMOS transistor P2 and the NMOS transistor N2 are commonly connected to the node A.

The delay capacity unit 182_5 delays an output signal of the delay driving unit 182_4 for a given period of time and transmits the output signal to the delay driving unit 182_6. When an output voltage of the delay driving unit 182_4 changes to a high level, i.e., a power supply is transmitted through the PMOS transistor P2, the delay capacity unit 182_5 maintains a low voltage level at node B by charging the output voltage until the charged voltage reaches a predetermined standard. The delay capacity unit 182_5 does not immediately transmit the output signal of the delay driving unit 182_4 to the delay driving unit 182_6, but delays the output signal for a given period of time. The delay capacity unit 182_5 includes a NMOS capacitor NC2 connected between the ground voltage terminal and the output terminal (node B) of the delay driving unit 182_4.

The delay driving unit 182_6 inverts the output signal of the delay driving unit 182_4 delayed by the delay capacity unit 182_5 and outputs the delayed write signal PTM_wen. The delay driving unit 182_6 includes a resistor R4 serially connected between the power voltage terminal and the ground voltage terminal, a PMOS transistor P3, a NMOS transistor N3, and a resistor R5. The gates of the PMOS transistor P3 and the NMOS transistor N3 are commonly connected to the node B.

The storing and restoring control unit 182_1 activates the control signals PTM_pgate and PTM_pl according to the activation of the short-term data write signal STM_we or the power-on reset control signal PORCON. The control signals PTM_pgate and PTM_pl are signals for storing data in the ferroelectric capacitor of the data storing and amplifying unit 184 or restoring the data stored in the ferroelectric capacitor.

The storing and restoring control unit 182_1 includes inverters IV6, IV7, and a NAND gate ND2. The inverter IV6 inverts the short-term data write signal STM_we. The NAND gate ND2 performs a NAND operation on the power-on reset control signal PORCON and an output signal of the inverter IV6 and outputs the plate signal PTM_pl. The inverter IV7 inverts the plate signal PTM_pl and outputs the gate signal PTM_pgate.

Hereinafter, the operation of the PT control unit 182 is described.

While power is normally supplied to the RFID device, the short-term data write signal STM_we is activated and transits to a high level to store the flag data in the short-term memory 180. The NMOS transistor N1 is turned on so that an output voltage of the pull-up delay driving unit 182_2 has a ground voltage level.

However, node A is maintained at a high level until a voltage charged in the pull-up delay capacity unit 182_3 is sufficiently discharged through the NMOS transistor N1 because the pull-up delay capacity unit 182_3 is charged. That is, the output signal of the pull-up delay driving unit 182_2 is not immediately transmitted to the delay driving unit 182_4 but rather is delayed until the pull-up delay capacity unit 182_3 is sufficiently discharged.

When the pull-up delay capacity unit 182_3 is sufficiently discharged to transit the voltage of node A to a low voltage level, the PMOS transistor P2 is turned on so that an output voltage of the delay driving unit 182_4 has a power voltage level. However, node B is maintained at a low level until the delay capacity unit 182_5 is sufficiently charged by the power voltage supplied through the PMOS transistor P2 because the pull-up delay capacity unit 182_3 is discharged. That is, the output signal of the delay driving unit 182_4 is not immediately transmitted to the delay driving unit 182_6 but rather is delayed until the delay capacity unit 182_5 is sufficiently charged.

When the delay capacity unit 182_5 is sufficiently charged to transit the voltage of node B to a high voltage level, the NMOS transistor N3 is turned on and outputs the delayed write signal PTM_wen at a low level.

The short-term data write signal STM_we is thereby transited to a low level. Conversely to the above-described process, the NMOS capacitor NC1 is then re-charged and the delayed write signal PTM_wen is again transited to a high level until the NMOS capacitor NC2 is discharged again.

The capacity of the NMOS capacitors NC1, NC2 is regulated in order to control a pulse width of the delayed write signal PTM_wen.

When the short-term data write signal STM_we is activated or when power is turned off and then on activating the power-on reset control signal PORCON, the control signals PTM_pl and PTM_pgate for storing data or restoring the data in the data storing and amplifying unit 184 are outputted.

Figure 5:
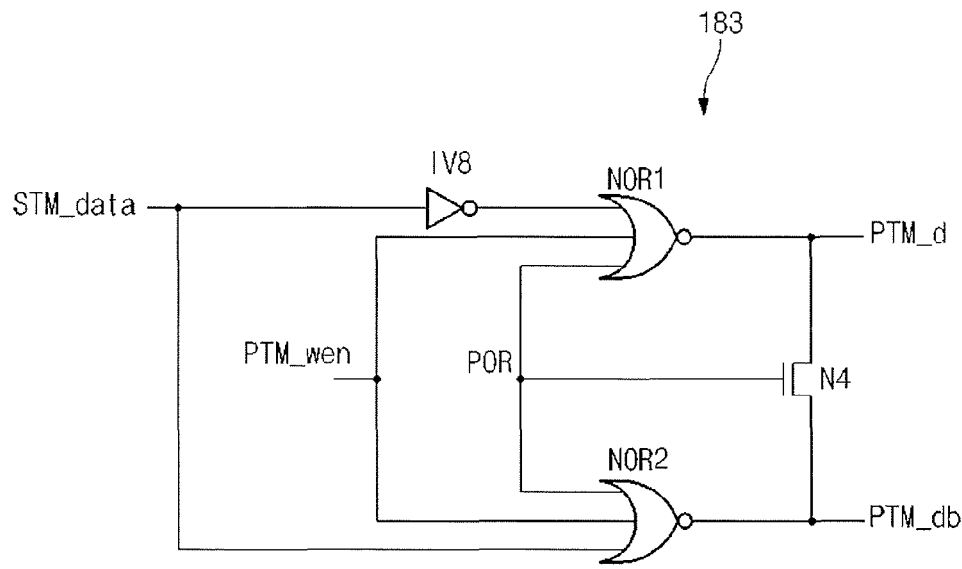
FIG. 5 is a diagram showing a short-term data control unit of FIG. 2.
Figure 5:
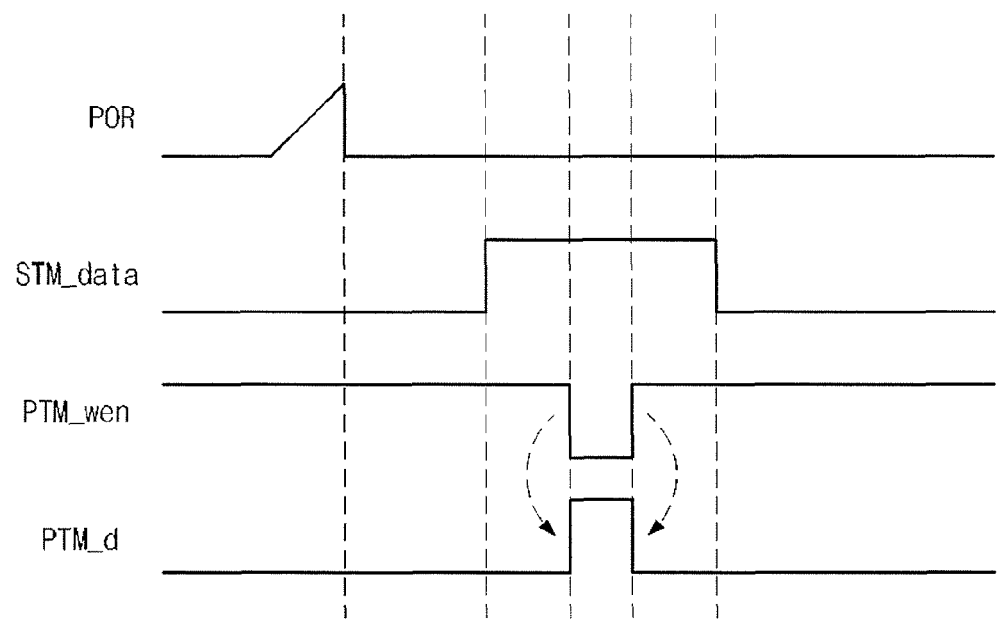

FIG. 5 is a diagram illustrating the short-term data control unit 183 of FIG. 2.

The short-term data control unit 183 includes an inverter IV8, NOR gates NOR1, NOR2, and a NMOS transistor N4.

The inverter IV8 inverts the data signal STM_data and outputs the inverted signal to an input terminal of the NOR gate NOR1. The NOR gate NOR1 performs a NOR operation on an output signal of the inverter IV8, the delayed write signal PTM_wen, and the power-on reset signal POR and outputs the delayed data signal PTM_d. The NOR gate NOR2 performs a NOR operation on the data signal STM_data, the delayed write signal PTM_wen, and the power-on reset signal POR and outputs the inverted delayed data signal PTM_db. The NMOS transistor N4 is connected between output terminals of the NOR gate NOR1 and the NOR gate NOR2 and has a gate receiving the power-on reset signal POR.

Hereinafter, the operation of the short-term data control unit 183 is described with reference to FIG. 5.

While power is normally supplied to the RFID device, the power-on reset signal POR is maintained at a low level. The short-term data signal STM_data is supplied from the digital block 200 to store the flag data and the short-term data write signal STM_we is activated. As shown in FIG. 5, the delayed write signal PTM_wen is activated at a low level value.

The short-term data control unit 183 converts the short-term data signal STM_data into the delayed data signals PTM_d, PTM_db while the delayed write signal PTM_wen is maintained at a low level and outputs the converted signals to the data storing and amplifying unit 184. That is, the short-term data control unit 183 converts the short-term data signal STM_data to where the pulse widths of the delayed data signals PTM_d, PTM_db are identical to that of the delayed write signal PTM_wen.

While the delayed write signal PTM_wen is maintained at a low level, the short-term data signal STM_data is supplied to the data storing and amplifying unit 184. The PT control unit 182, as shown in FIG. 4, regulates the pulse width of the delayed write signal PTM_wen and controls the time the flag data is temporarily stored in the data storing and amplifying unit 184.

Figure 6:
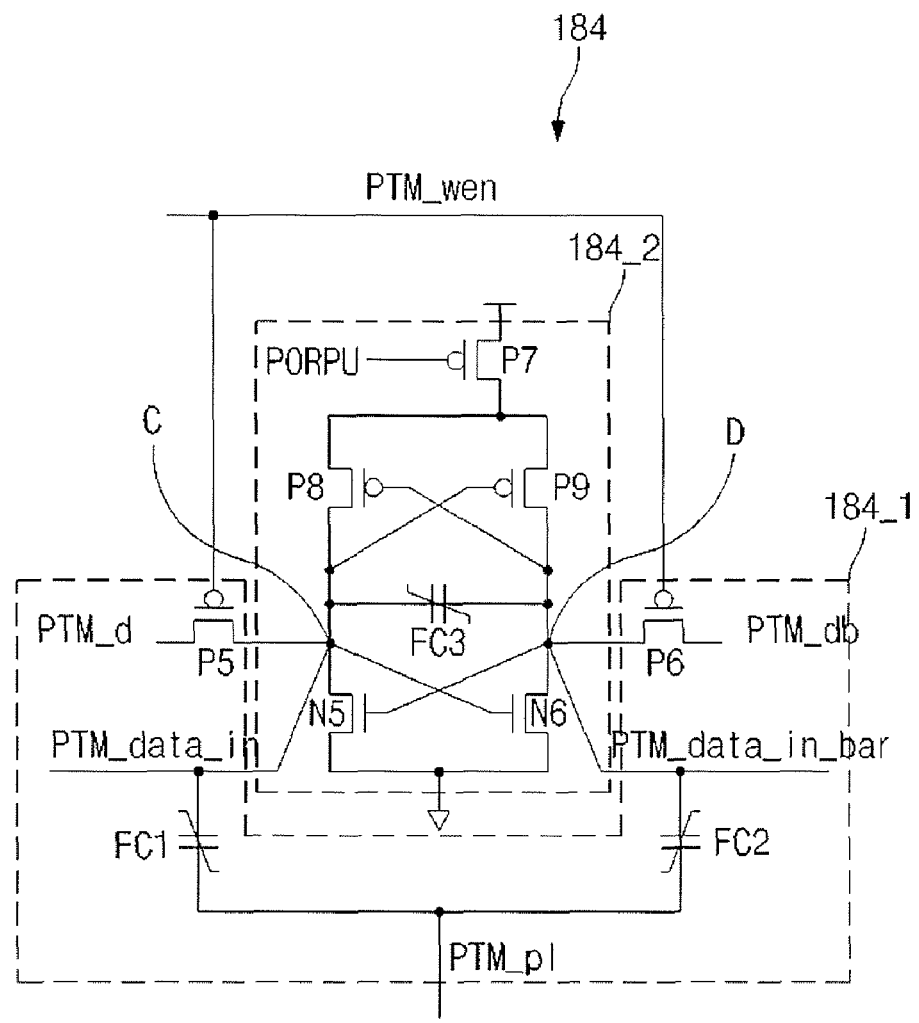
FIG. 6 is a diagram showing a data storing and amplifying unit of FIG. 2.

FIG. 6 is a diagram illustrating the data storing and amplifying unit 184 of FIG. 2.

The data storing and amplifying unit 184 includes a data storing unit 184_1 and an amplifying unit 184_2.

The data storing unit 184_1 stores the delayed data signals PTM_d, PTM_db received from the short-term data control unit 183 in the write mode. The data storing unit 184_1 outputs the delayed data input signals PTM_data_in, PTM_data_in_bar to the PT and dummy PT adjusting unit 185. That is, the data storing unit 184_1 stores the flag data upon activation of the delayed write signal PTM_wen. The data storing unit 184_1 outputs the flag data to the PT and dummy PT adjusting unit 185.

The data storing unit 184_1 includes PMOS transistors P5, P6, and ferroelectric capacitors FC1, FC2. The PMOS transistor P5 is connected between an input terminal of the delayed data signal PTM_d and an output node C and has a gate receiving the delayed write signal PTM_wen. The PMOS transistor P6 is connected between an input terminal of the delayed data signal PTM_db and an output node D and has a gate receiving the delayed write signal PTM_wen.

The ferroelectric capacitor FC1 is connected between the output node C and an input terminal of the plate signal PTM_pl. The ferroelectric capacitor FC2 is connected between the output node D and an input terminal of the plate signal PTM_pl.

In the restoration mode, i.e., when power is turned off and then on activating the plate signal PTM_pl and the power-on reset pull-up signal PORPU, the amplifying unit 184_2 amplifies the flag data stored in the data storing unit 184_1 and outputs the amplified data to the PT and dummy PT adjusting unit 185. The amplifying unit 184_2 includes PMOS transistors P7~P9, NMOS transistors N5, N6, and a ferroelectric capacitor FC3.

The PMOS transistor P7 is connected between the power voltage terminal and a common node of the PMOS transistors P8, P9 and has a gate receiving the power-on reset pull-up signal PORPU. The PMOS transistors P8, P9 are cross-coupled between the PMOS transistor P7 and the nodes C, D such that the gates of the PMOS transistors P8, P9 are connected to the output nodes D, C, respectively. The NMOS transistors N5, N6 are cross-coupled between the nodes C, D and the ground voltage terminal such that gates of the NMOS transistors N5, N6 are connected to the nodes D, C, respectively. The ferroelectric capacitor FC3 is connected between the nodes C, D.

Hereinafter, the operation of the data storing and amplifying unit 184 is described.

When the flag data is stored in the short-term memory 180 while power is normally supplied to the RFID device (in the write mode), the short-term data write signal STM_we is supplied from the digital block 200. As shown in FIG. 4, the delayed write signal PTM_wen and plate signal PTM_pl are activated. As a result, the delayed data signals PTM_d, PTM_db from the short-term data control unit 183 are supplied to the data storing unit 184_1 through the PMOS transistors P5, P6, respectively to store the flag data in the ferroelectric capacitors FC1~FC3.

The delayed data signals PTM_d, PTM_db represented as the delayed data input signals PTM_data_in, PTM_data_in_bar are transmitted to the PT and dummy PT adjusting unit 185.

Figure 7:
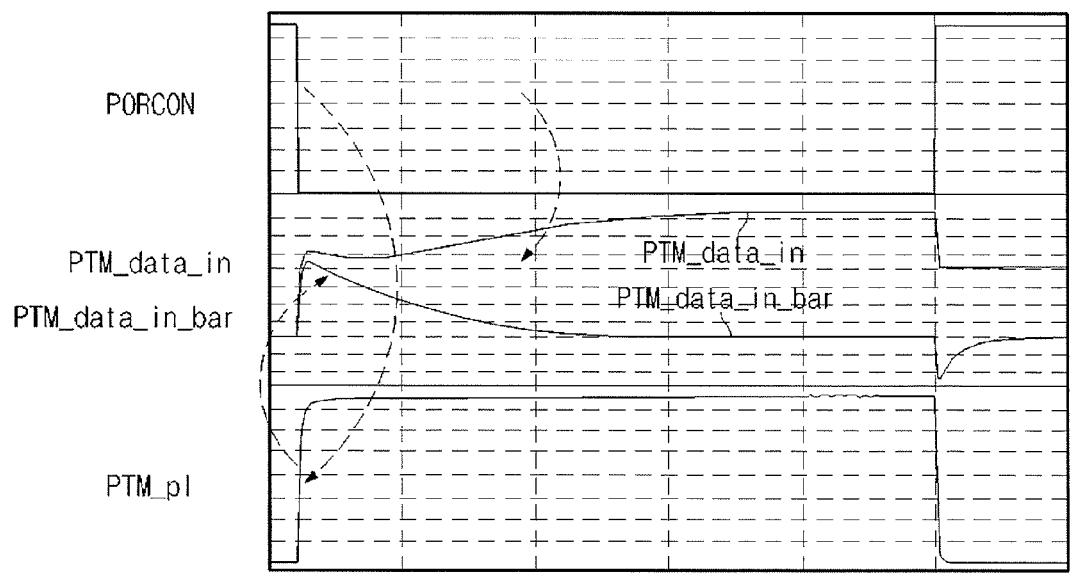
FIG. 7 is a diagram showing the change of a flag data input signal by ferroelectric capacitors FC1, FC2 when a power source is turned off and then on in FIG. 6.

As a result, when power is temporarily turned off and then on while the flag data is stored (in the restoration mode), the plate signal PTM_pl is activated and transits to a high level according to the power-on reset control signal PORCON. Output voltages of the ferroelectric capacitors FC1 and FC2 change according to ferroelectric characteristics as shown in FIG. 7 and are outputted to the nodes C, D.

The PMOS transistor P9 and the NMOS transistor N6 are turned on according to voltages at the nodes C, D, and the PMOS transistor P7 is turned on according to the power-on reset pull-up signal PORPU. As a result, the voltages at the nodes C, D are amplified to a power voltage level and a ground voltage level. The flag data is amplified and outputted as the delayed data input signals PTM_data_in PTM_data_in_bar to the PT and dummy PT adjusting unit 185.

Figure 8:
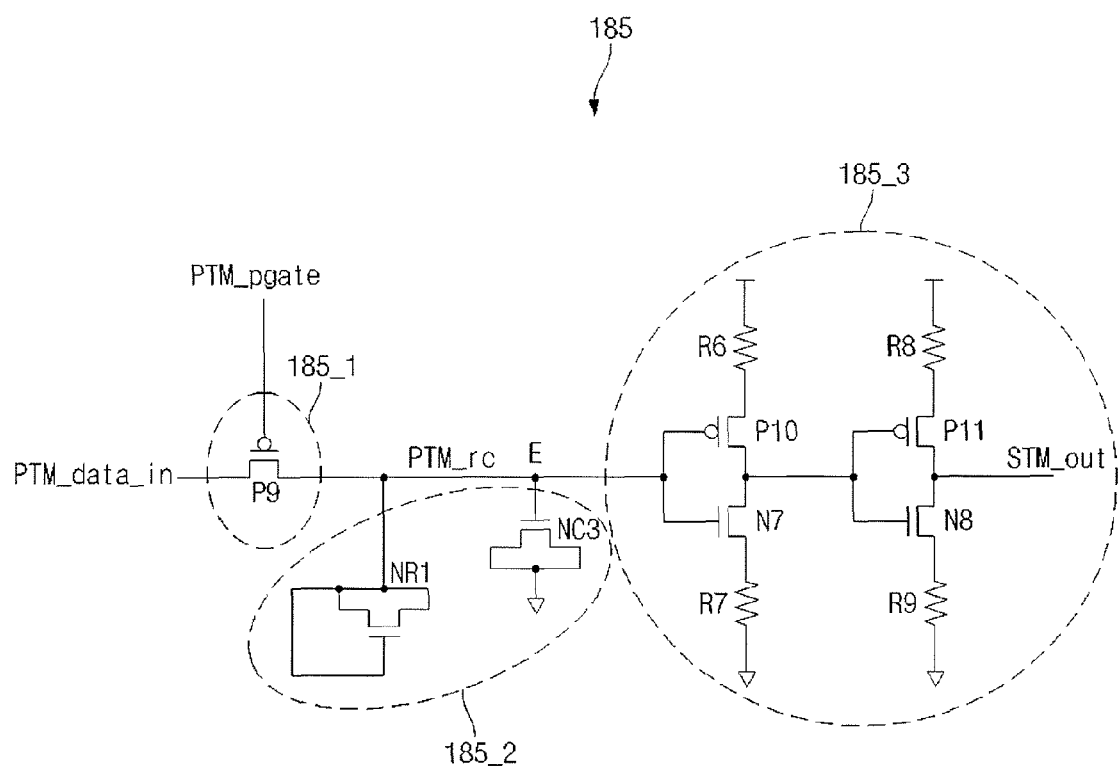
FIG. 8 is a diagram showing a PT adjusting unit in PT and dummy PT adjusting unit of FIG. 2.

FIG. 8 is a diagram illustrating the PT adjusting unit in the PT and dummy PT adjusting unit 185 of FIG. 2.

The PT adjusting unit includes a flag input control unit 185_1, a delay unit 185_2, and a flag driving unit 185_3.

The flag input control unit 185_1 selectively transmits the delayed data input signal PTM_data_in to the flag driving unit 185_3 according to the gate signal PTM_pgate. The flag input control unit 185_1 includes a PMOS transistor P9. The PMOS transistor P9 is connected between an input terminal of the delayed data input signal PTM_data_in and the flag driving unit 185_3 and has a gate receiving the gate signal PTM_pgate.

The delay unit 185_2 maintains an output signal PTM_rc of the flag input control unit 185_1 at a high level for a given period of time. The delay unit 185_2 includes a delay capacity unit NC3 and a delay resistor NR1. The NMOS capacitor NC3 is connected between an output terminal of the flag input control unit 185_1 and the ground voltage terminal. The NMOS capacitor NR1 is connected to the output terminal of the flag input control unit 185_1.

The flag driving unit 185_3 drives the output signal PTM_rc of the flag input control unit 185_1, which is maintained by the delay unit 185_2 and outputs the short-term data output signal STM_out. The flag driving unit 185_3 includes resistors R6~R9, PMOS transistors P10, P11, and NMOS transistors N7, N8.

The resistor R6, the PMOS transistor P10, the NMOS transistor N7, and the resistor R7 are serially connected between the power voltage terminal and the ground voltage terminal. The gates of the PMOS transistor P10 and the NMOS transistor N7 are commonly connected to the output terminal of the flag input control unit 185_1. The resistor R8, the PMOS transistor P11, the NMOS transistor N8, and the resistor R9 are serially connected between the power voltage terminal and the ground voltage terminal. The gates of the PMOS transistor P11 and the NMOS transistor N8 are commonly connected to a common node of the PMOS transistor P10 and the NMOS transistor N7.

Figure 9:
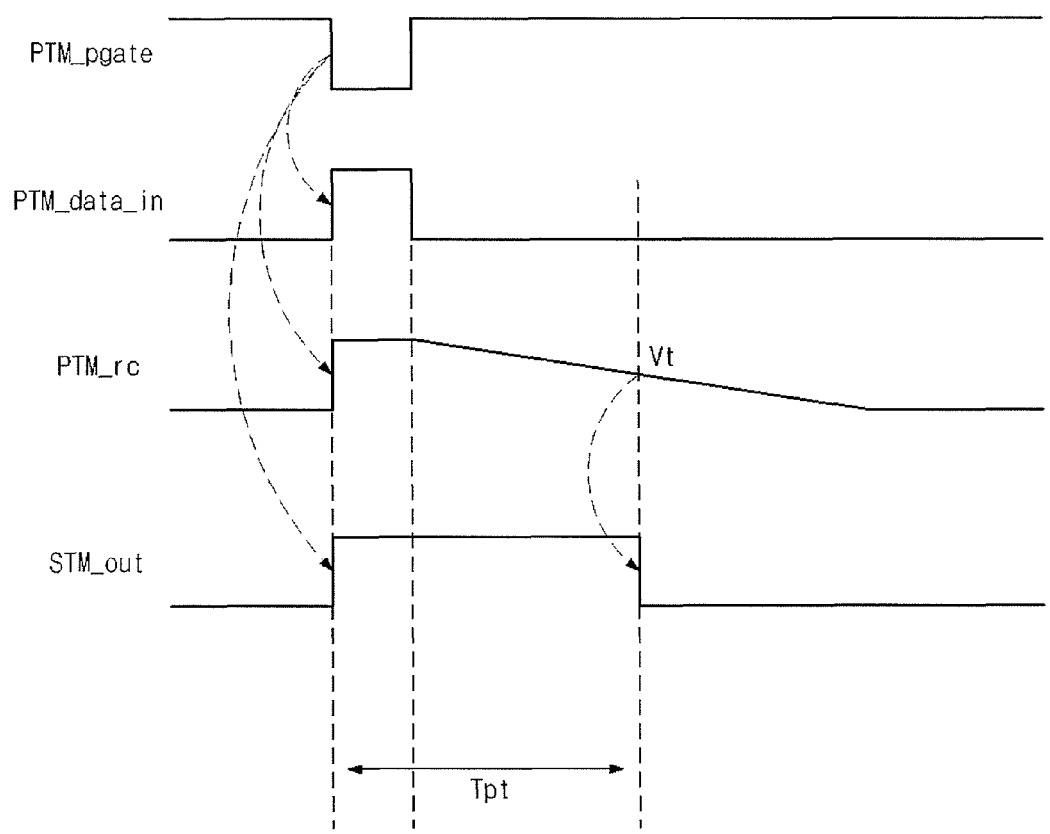
FIG. 9 is a timing diagram illustrating the operation of the PT adjusting unit.

FIG. 9 is a timing diagram illustrating the operation of the PT adjusting unit.

As shown in FIG. 4, the short-term data write signal STM_we or the power-on reset control signal PORCON is activated which actives the gate signal PTM_pgate at a low level. The PMOS transistor P9 is turned on and outputs the output signal PTM_rc to the flag driving unit 185_3.

The flag driving unit 185_3 outputs the short-term data output signal STM_out while simultaneously charging the NMOS capacitor NC3 of the delay unit 185_2 by the delay data input signal PTM_data_in.

When the gate signal PTM_pgate transits to a high level and turns off the NMOS transistor P9, the delayed data input signal PTM_data_in is disconnected, thereby finishing the charging of the NMOS capacitor NC3. The NMOS capacitor NC3 is gradually discharged via the delay resistor NR1 and the voltage level of node E gradually decreases. When a voltage level of the output signal PTM_rc reaches a predetermined level (low level) Vt, the short-term data output signal STM_out transits to a low level.

That is, even when the delayed data input signal PTM_data_in is disconnected, the voltage of node E is maintained at a high level via the NMOS capacitor NC3 for a given period of time. As a result, the short-term data output signal STM_out does not immediately transit to a low level but maintains a high level for a given period of time. The time period for which the short-term data output signal STM_out maintains a high level is determined by the capacity of the NMOS capacitor NC3.

Figure 10:
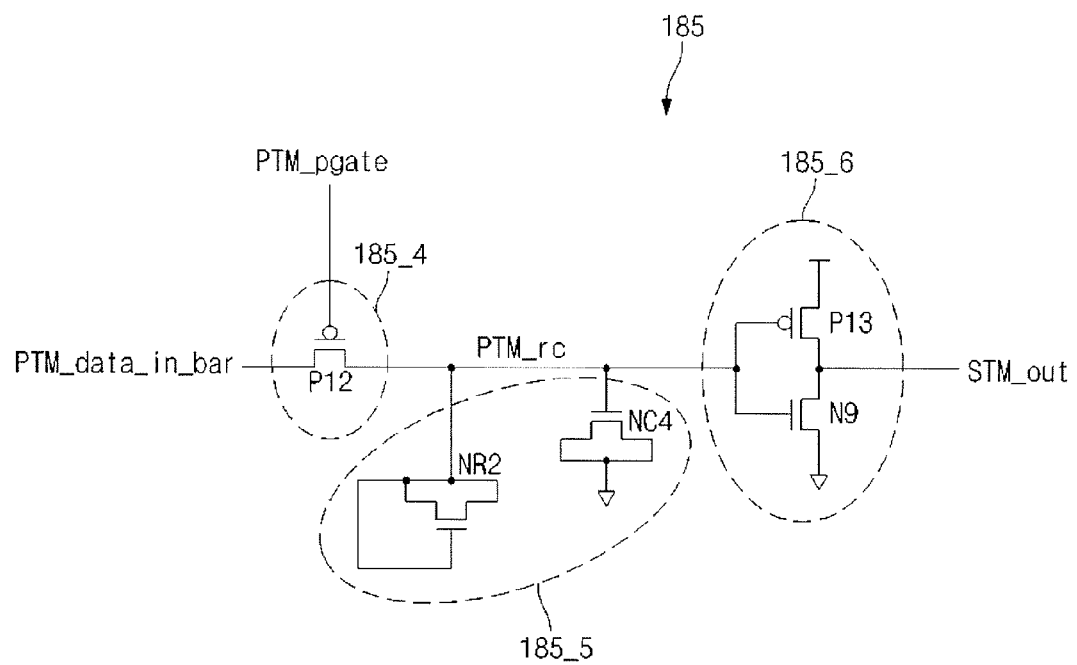
FIG. 10 is a detailed diagram showing a dummy PT adjusting unit in the PT and dummy PT adjusting unit of FIG. 2.

FIG. 10 is a detailed diagram illustrating the dummy PT adjusting unit in the PT and dummy PT adjusting unit 185 of FIG. 2.

The dummy PT adjusting unit outputs the short-term data output signal STM_out using the delayed data input signal PTM_data_in_bar when an error is generated in the PT adjusting unit of FIG. 8.

The dummy PT adjusting unit includes a flag input control unit 185_4, a delay unit 185_5, and a flag driving unit 185_6.

The flag input control unit 185_4 selectively transmits the delayed data input signal PTM_data_in_bar to the flag driving unit 185_6 according to the gate signal PTM_pgate. The flag input control unit 185_4 includes a PMOS transistor P12. The PMOS transistor P12 is connected between an input terminal of the delayed data input signal PTM_data_in_bar and the flag driving unit 185_6 and has a gate receiving the gate signal PTM_pgate.

The delay unit 185_5 maintains the output signal PTM_rc of the flag input control unit 185_4 at a high level for a given period of time. The delay unit 185_5 includes a delay capacity unit NC4 and a delay resistor NR2. The NMOS capacitor NC4 is connected between an output terminal of the flag input control unit 185_4 and the ground voltage terminal. The NMOS resistor NR2 is connected to the output terminal of the flag input control unit 185_4.

The flag driving unit 185_6 drives the output signal PTM_rc of the flag input control unit 185_4, which is maintained by the delay unit 185_5 and outputs the short-term data output signal STM_out. The flag driving unit 185_6 includes a PMOS transistor P13 and a NMOS transistor N9.

The PMOS transistor P13 and the NMOS transistor N9 are serially connected between the power voltage terminal and the ground voltage terminal. The gates of the PMOS transistor P13 and the NMOS transistor N9 are commonly connected to the output terminal of the flag input control unit 185_4.

Hereinafter, the operation of the short-term memory according to the embodiment of the present invention is described.

While power is normally supplied to the RFID device, the short-term data signal STM_data is supplied from the digital block 200 and the short-term data write signal STM_we is activated. The PT control unit 182 generates the delayed write signal PTM_wen to control a time in which the flag data is stored as shown in FIG. 4 and to output the signal to the short-term data control unit 183 and the data storing and amplifying unit 184.

The PT control unit 182 also generates the plate signal PTM_pl and the gate signal PTM_pgate and outputs the signals to the data storing and amplifying unit 184 and the PT and dummy PT adjusting unit 185, respectively. The plate signal PTM_pl is a signal for storing the flag data in the ferroelectric capacitors FC2 and FC3. The gate signal PTM_pgate is a signal for transmitting the output signals PTM_data_in and PTM_data_in_bar to the PT and dummy PT adjusting unit 185 from the data storing and amplifying unit 184.

The short-term data control unit 183 generates the delayed data signals PTM_d PTM_db according to the delayed write signal PTM_wen from the PT control unit 182 and the short-term data signal STM_data as shown in FIG. 5 and outputs the signals to the data storing and amplifying unit 184.

The data storing and amplifying unit 184 receives the delayed data signals PTM_d, PTM_db according to the delayed write signal PTM_wen from the PT control unit 182 as shown in FIG. 6 and stores the flag data in the ferroelectric capacitors FC1 and FC2 according to the delayed data signals PTM_d, PTM_db. Simultaneously, the data storing and amplifying unit 184 outputs the delayed data signals PTM_d, PTM_db as the delayed data input signals PTM_data_in and PTM_data_in_bar to the PT and dummy PT adjusting unit 185.

The PT and dummy PT adjusting unit 185 outputs the short-term data output signal STM_out to the digital block 200 using the delayed data input signal PTM_data_in as shown in FIG. 8.

When power is temporarily turned off and then on while the flag data is stored in the short-term memory 180, the power-on reset control signal PORCON and the power-on reset pull-up signal PORPU are activated by the power-on reset signal POR as shown in FIG. 3 and supplied to the PT control unit 182 and the data storing and amplifying unit 184 respectively.

When the power-on reset control signal PORCON is activated, the PT control unit 182 generates the plate signal PTM_pl and the gate signal PTM_pgate as shown in FIG. 4 and outputs the signals to the data storing and amplifying unit 184 and the PT and dummy PT adjusting unit 185 respectively.

Voltages of the output nodes C, D of the data storing and amplifying unit 184 are maintained using the ferroelectric capacitor FC3 for a given period of time even when the power is off. When the power-on reset pull-up signal PORPU is activated, the output nodes C, D are pulled up.

When the plate signal PTM_pl is activated and the voltages of the output nodes C, D are pulled up, the flag data stored in the ferroelectric capacitors FC1, FC2 are outputted as the delayed data input signals PTM_data_in and PTM_data_in_bar to the PT and dummy PT adjusting unit 185 according to a ferroelectric characteristic.

The PT and dummy PT adjusting unit 185 outputs the short-term data output signal STM_out to the digital block 200 using the delayed data input signal PTM_data_in as shown in FIG. 8. As a result, the digital block 200 receives the flag data stored in the short-term memory 180 even though the power is temporarily turned off and then on.

Figure 11:
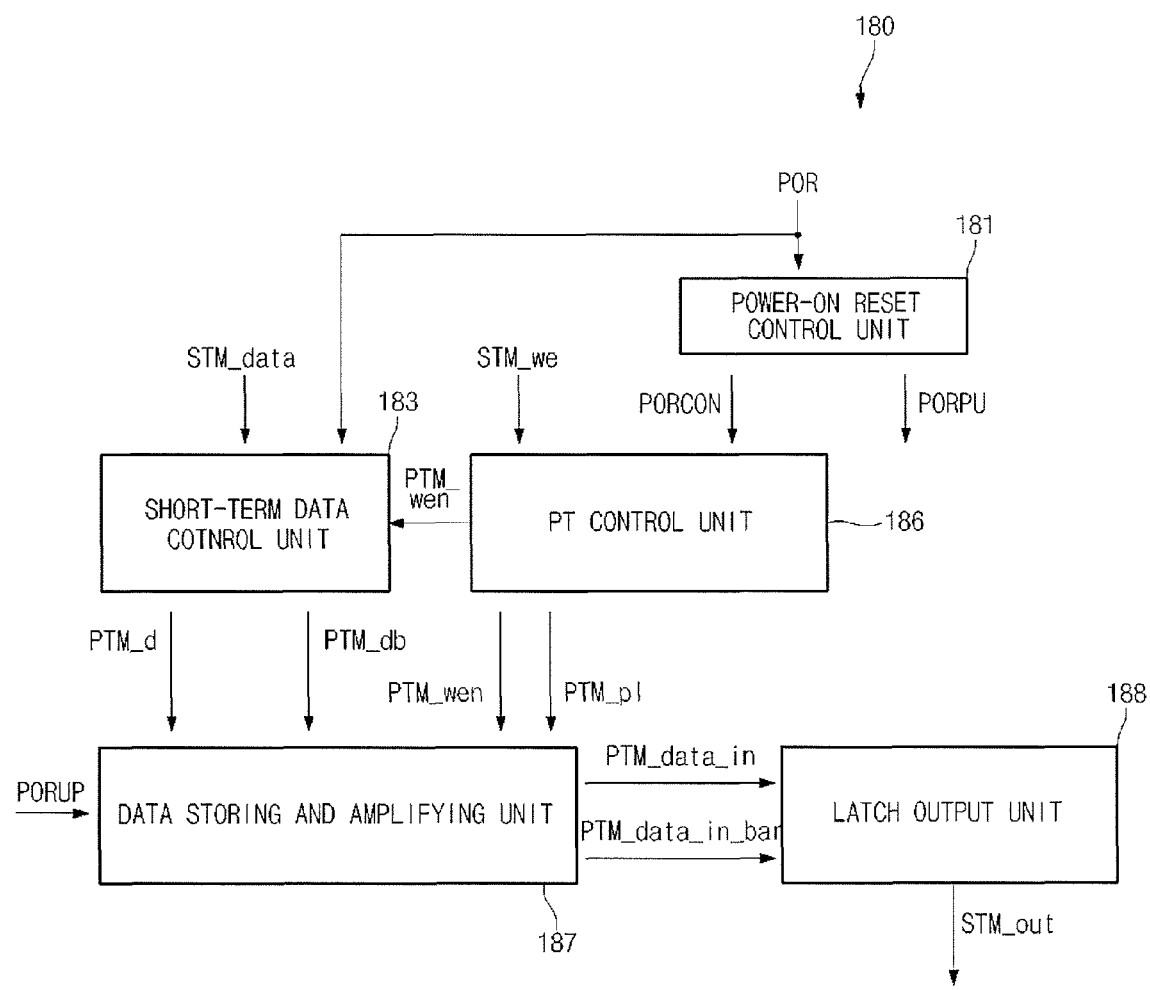
FIG. 11 is a diagram showing a short-term memory according to an embodiment of the present invention.

FIG. 11 is a diagram showing the short-term memory 180 according to an embodiment of the present invention. The same reference numbers of FIG. 2 are used for the same components shown in FIG. 11 for convenience.

The short-term memory 180 of FIG. 11 includes the POR control unit 181, a PT control unit 186, the short-term data control unit 183, a data storing and amplifying unit 187, and a latch output unit 188.

The PT control unit 186 controls a time period for when the flag data is stored in the data storing and amplifying unit 187 according to the power-on reset control signal PORCON received from the POR control unit 181, and the short-term data write signal STM_we received from the digital block 200. The PT control unit 186 generates the plate signal PTM_pl for storing and restoring the flag data.

That is, the PT control unit 186 outputs the delayed write signal PTM_wen that has a pulse width that corresponds to a predetermined time such that the flag data is stored in the data storing and amplifying unit 187 during activation of the short-term data write signal STM_we for the predetermined time. The PT control unit 186 outputs the plate signal PTM_pl to store or restore the flag data stored in the data storing and amplifying unit 184 during activation of the write signal STM_we or the power-on reset control signal PORCON.

The data storing and amplifying unit 187 stores the flag data according to the delayed data signals PTM_d and PTM_db, the delayed write signal PTM_wen, and the plate signal PTM_pl in the write mode. The data storing and amplifying unit 187 amplifies the flag data according to the plate signal PTM_pl and the power-on reset pull-up signal PORPU in the restoration mode.

That is, the data storing and amplifying unit 187 stores the flag data in the ferroelectric capacitor according to the delayed data signals PTM_d and PTM_db upon activation of the delayed write signal PTM_wen and the plate signal PTM_pl. Simultaneously, the data storing and amplifying unit 187 outputs the stored data to the latch output unit 188. When power is turned off and then on activating the power-on reset pull-up signal PORPU and the plate signal PTM_pl, the data storing and amplifying unit 187 amplifies the flag data stored in the ferroelectric capacitor and outputs the flag data to the latch output unit 188.

The latch output unit 188 latches the output signals PTM_data_in, PTM_data_in_bar from the data storing and amplifying unit 187 and outputs the short-term data signal STM_out.

Figure 12:
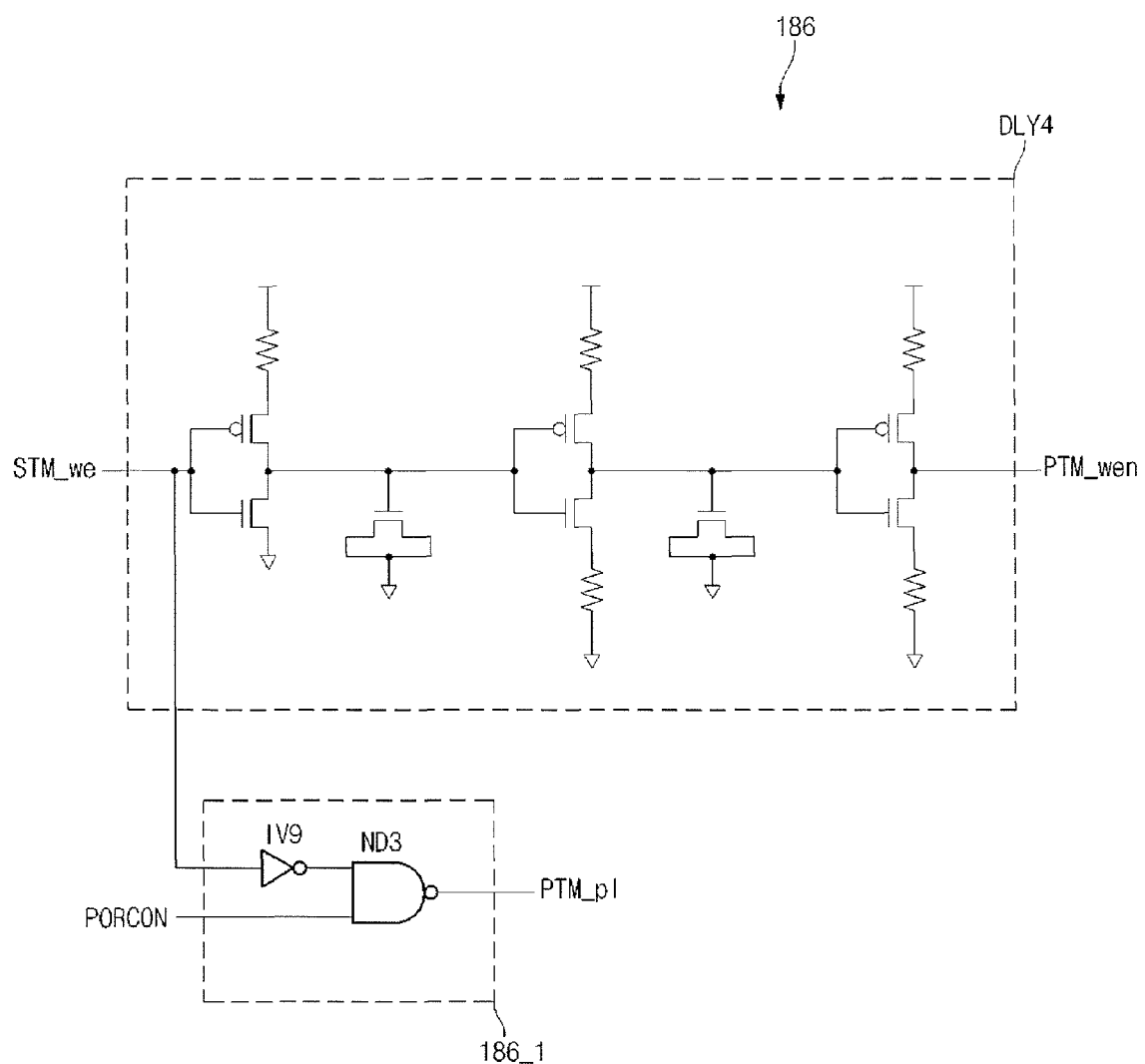
FIG. 12 is a diagram showing a PT control unit of FIG. 11.

FIG. 12 is a diagram illustrating the PT control unit 186 of FIG. 11.

The PT control unit 186 includes the delay unit DLY4 and the storing and restoring control unit 186_1. The delay unit DLY4 of FIG. 12 is substantially the same as the delay unit DLY3 of FIG. 4. When the short-term data write signal STM_we or power-on reset control signal PORCON is activated, the storing and restoring control unit 186_1 outputs the plate signal PTM_pl for storing flag data in the ferroelectric capacitor or for restoring the flag data.

The storing and restoring control unit 186_1 includes an inverter IV9 and a NAND gate ND3. The inverter IV9 inverts the short-term data write signal STM_we. The NAND gate ND3 performs a NAND operation on the power-on reset control signal PORCON and an output signal of the inverter IV9 and outputs the plate signal PTM_pl.

Figure 13:
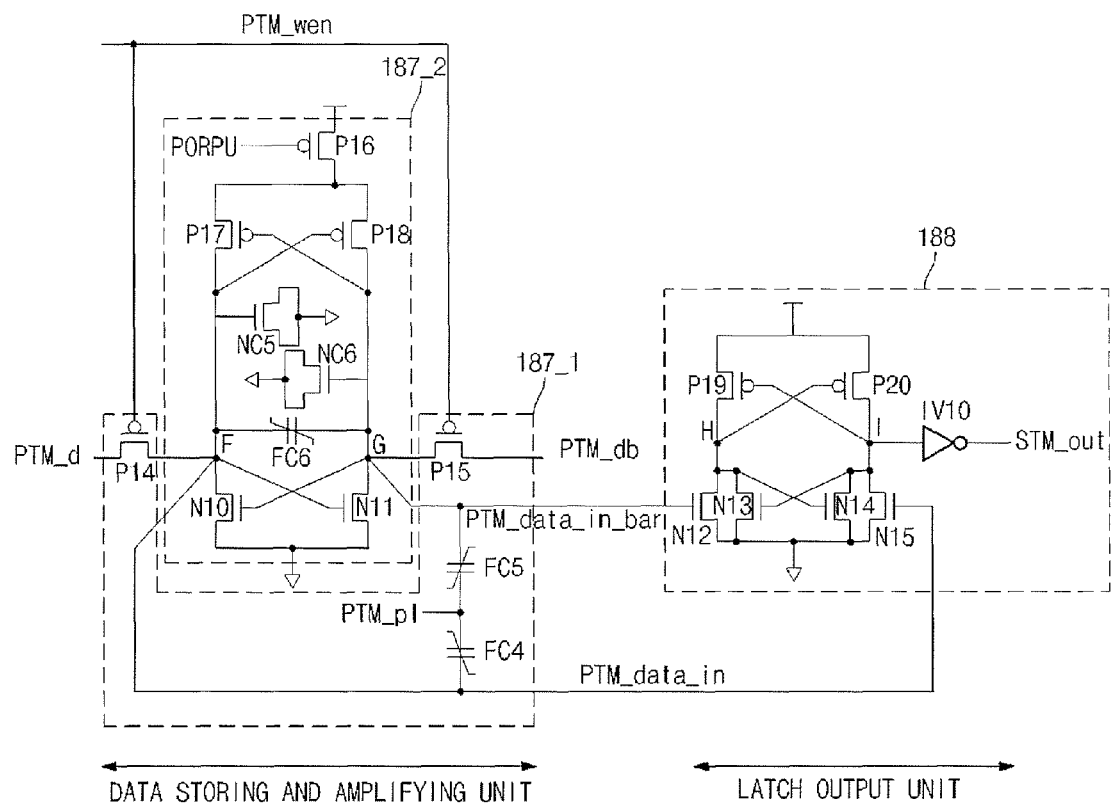
FIG. 13 is a diagram showing a data storing and amplifying unit and a latch output unit of FIG. 11.

FIG. 13 is a diagram illustrating the data storing and amplifying unit 187 and the latch output unit 188 of FIG. 11.

The data storing and amplifying unit 187 includes a data storing unit 187_1 and an amplifying unit 187_2.

The data storing unit 187_1 outputs the delayed data input signals PTM_data_in, PTM_data_in_bar to the latch output unit 188 while storing the delayed data signals PTM_d, PTM_db received from the short-term data control unit 183 in the write mode.

That is, the data storing unit 187_1 stores the flag data during activation of the delayed write signal PTM_wen. At the same time, the data storing unit 187_1 outputs the flag data to the latch output unit 188.

The data storing unit 187_1 includes PMOS transistors P14, P15 and ferroelectric capacitors FC5, FC6. The PMOS transistor P14 is connected between an input terminal of the delayed data signal PTM_d and output node F and has a gate receiving the delayed write signal PTM_wen. The PMOS transistor P15 is connected between an input terminal of the delayed data signal PTM_db and output node G and has a gate receiving the delayed write signal PTM_wen.

The ferroelectric capacitor FC4 is connected between output node F and an input terminal of the plate signal PTM_pl. The ferroelectric capacitor FC5 is connected between output node G and the input terminal of the plate signal PTM_pl.

The amplifying unit 187_2 amplifies the flag data stored in the data storing unit 187_1 and outputs the data to the latch output unit 188 in the restoration mode, that is, when power is turned off and then on activating the plate signal PTM_pl and the power-on reset pull-up signal PORPU. The amplifying unit 187_2 includes PMOS transistors P16~P18, NMOS transistors N10, N11, a ferroelectric capacitor FC6, and NMOS capacitors NC5, NC6.

The PMOS transistor P16 is connected between a power voltage terminal and a common node of the PMOS transistors P17, P18 and has a gate receiving the power-on reset pull-up signal PORPU. The PMOS transistors P17, P18 are cross-coupled between the PMOS transistor P16 and output nodes F, G such that gates of the PMOS transistors P17, P18 are connected to output nodes G, F, respectively.

The NMOS transistors N10, N11 are cross-coupled between nodes F, G and a ground voltage terminal such that the gates of the NMOS transistors N10, N11 are connected to nodes G, F, respectively. The ferroelectric capacitor FC6 is connected between output nodes F and G. The NMOS capacitors NC5, NC6 are connected between output nodes F, G and the ground voltage terminal, respectively.

The latch output unit 188 includes PMOS transistors P19, P20 and NMOS transistors N12~N15. The PMOS transistors P19, P20 are cross-coupled between the power voltage terminal nodes H and I such that the gates of the PMOS transistors P19, P20 are connected to nodes I, H, respectively.

The NMOS transistors N12, N13 are connected in parallel between node H and the ground voltage terminal. A gate of the NMOS transistor N12 is connected to the delayed data input signal PTM_data_in_bar and a gate of the NMOS transistor N13 is connected to node I.

The NMOS transistors N14, N15 are connected in parallel between node I and the ground voltage terminal. A gate of the NMOS transistor N14 is connected to node H and a gate of the NMOS transistor N15 is connected to the delayed data input signal PTM_data_in.

The operation of the data storing and amplifying unit 187 and the latch output unit 188 are described.

When the flag data is stored in the short-term memory 180 (in write mode) while power is normally supplied to the RFID device, the short-term data write signal STM_we is supplied from the digital block 200 to activate the delayed write signal PTM_wen and the plate signal PTM_pl. The delayed data signals PTM_d, PTM_db from the short-term data control unit 183 are supplied to the data storing unit 187_1 via PMOS transistors P14, P15, respectively.

The delayed data signals PTM_d, PTM_db are transmitted to the latch output unit 188 as delayed data input signals PTM_data_in, PTM_data_in_bar.

The latch output unit 188 latches the delayed data input signals PTM_data_in, PTM_data_in_bar and outputs the short-term data output signal STM_out. When the write mode is finished and the delayed data input signals PTM_data_in, PTM_data_in_bar are supplied having a low level, the latch output unit 188 continuously outputs the latched data.

That is, in the write mode, when the delayed data input signal PTM_data_in is supplied having a high level and the delayed data input signal PTM_data_in_bar is supplied having a low level, the NMOS transistor N15 is turned on so node I is at a ground voltage level. As a result, the short-term data output signal STM_out has a high level and is outputted via the inverter IV10. Also, the PMOS transistor P19 is turned on and the NMOS transistor N14 is turned on.

The write mode is finished when the delayed data input signals PTM_data_in, PTM_data_in_bar are supplied having a low level. The NMOS transistor N15 is then turned off, but the NMOS transistor N14 remains on so the short-term data output signal STM_out maintains a low level.

When power is temporarily turned off and then on (in the restoration mode) while the latched data is being outputted, the plate signal PTM_pl is activated having a high level according to the power-on reset control signal PORCON. Output voltages of the ferroelectric capacitors FC4, FC5 change according to a ferroelectric characteristic as shown in FIG. 7. The output voltages of the ferroelectric capacitors FC4, FC5 are outputted to nodes F, G. The voltages at nodes F, G are amplified at a power voltage level and a ground voltage level by the amplifying unit 187_2.

The amplified flag data is outputted to the latch output unit 188 as the delayed data input signals PTM_data_in, PTM_data_in_bar. The latch output unit 188 latches the delayed data input signals PTM_data_in, PTM_data_in_bar as in the write mode to output the short-term data output signal STM_out and maintain a state of the short-term data output signal STM_out.

As described above, a RFID tag according to an embodiment of the present invention restores flag data when a power source is temporarily turned off and then on enabling the RFID tag to perform a stable and fast data processing operation.

Although a number of illustrative embodiments consistent with the invention have been described, it should be understood that numerous other modifications and embodiments can be devised by those skilled in the art that will fall within the spirit and scope of the principles of this disclosure. Particularly, numerous variations and modifications are possible in the component parts and/or arrangements that are within the scope of the disclosure, the drawings and the accompanying claims. In addition to variations and modifications in the component parts and/or arrangements, alternative uses will also be apparent to those skilled in the art.

What is claimed is:

1. A RFID tag comprising:
an analog block generating a driving power using a radio frequency signal received through an antenna and using the driving power to store flag data;
a digital block receiving the driving power to operate and processing radio frequency data transmitted and received through the analog block to store the flag data in the analog block; and
a memory block reading and writing data to a first nonvolatile ferroelectric capacitor according to a control signal from the digital block,
wherein the analog block supplies the flag data to the digital block when a power-on reset signal is activated for a given period of time.

2. The RFID tag according to claim 1, wherein the analog block comprises:
a power-on reset unit outputting the power-on reset signal in response to a change in the driving power; and
a short-term memory storing the flag data during activation of a short-term data write signal received from the digital block and supplying the flag data to the digital block during activation of the power-on reset signal.

3. The RFID tag according to claim 2, wherein the short-term memory comprises:
a first power-on reset control unit outputting a power-on reset control signal and a power-on reset pull-up signal when the power-on reset signal is inactive;
a first persistent time control unit outputting a plate signal and a gate signal for storing and restoring the flag data, and a delayed write signal for controlling a time when the flag data is stored according to the power-on reset control signal and the short-term data write signal;
a first short-term data control unit converting the flag data according to the delayed write signal and outputting a delayed data signal;
a first data storing and amplifying unit storing the flag data according to the delayed data signal, the delayed write signal, and the plate signal during activation of the short-term data write signal, and amplifying and outputting the stored flag data according to the plate signal and the power-on reset pull-up signal during activation of the power-on reset signal; and a persistent time adjusting unit delaying an output signal of the first data storing and amplifying unit according to the gate signal for a given period of time and outputting the output signal of the first data storing and amplifying unit to the digital block.

4. The RFID tag according to claim 3, wherein the first persistent time control unit comprises:
a first short-term write delay unit delaying and inverting the short-term data write signal and outputting the delayed write signal; and
a first storing and restoring control unit to activating the plate signal and the gate signal during activation of the short-term data write signal or the power-on reset control signal.

5. The RFID tag according to claim 4, wherein the first short-term write delay unit comprises:
a first pull-up delay driving unit inverting and pulling-up the short-term data write signal;
a first delay driving unit inverting an output signal of the first pull-up delay driving unit;
a second delay driving unit inverting the output signal of the first delay driving unit and outputting the delayed write signal;
a first pull-up delay capacity unit delaying the output signal of the first pull-up delay driving unit for a given period of time and outputting the output signal of the first pull-up delay driving unit to the first delay driving unit; and
a first delay capacity unit delaying the output signal of the first delay driving unit for a given period of time and outputting the output signal of the first delay driving unit to the second delay driving unit.

6. The RFID tag according to claim 3, wherein the first short-term data control unit converts the flag data so that the delayed data signal has a pulse width that is the same as a pulse width of the delayed write signal.

7. The RFID tag according to claim 3, wherein the first data storing and amplifying unit comprises:
a first data storing unit storing the delayed data signal in a second ferroelectric capacitor according to the delayed write signal and the plate signal; and
a first amplifying unit reading and amplifying data stored in the second ferroelectric capacitor according to the plate signal and the power-on reset pull-up signal and outputting the data stored in the second ferroelectric capacitor to the persistent time adjusting unit.

8. The RFID tag according to claim 7, wherein the first data storing unit transmits the delayed data signal to the persistent time adjusting unit while storing the delayed data signal.

9. The RFID tag according to claim 3, wherein the persistent time adjusting unit comprises:
a first flag input control unit transmitting an output signal of the first data storing and amplifying unit according to the gate signal;
a first delay unit maintaining a level of an output signal of the first flag input control unit for a given period of time; and
a first flag driving unit driving the output signal maintained by the first delay unit and outputting the output signal to the digital block.

10. The RFID tag according to claim 9, wherein the first delay unit comprises:
a second delay capacity unit charging the output signal of the first flag input control unit; and
a delay resistor discharging charges that are charged in the second delay capacity unit.

11. The RFID tag according to claim 9, wherein the first data storing and amplifying unit outputs differential signals of the flag data, and
the persistent time adjusting unit further includes a dummy timing adjusting unit delaying and inverting a different signal of the differential signals.

12. The RFID tag according to claim 11, wherein the dummy timing adjusting unit comprises:
a second flag input control unit transmitting the inverted different signal of the differential signals of the first data storing and amplifying unit according to the gate signal;
a second delay unit maintaining a level of an output signal of the second flag input control unit for a given period of time; and
a second flag driving unit driving the output signal maintained by the second delay unit.

13. The RFID tag according to claim 3, wherein the first power-on reset control unit delays the power-on reset control signal for a given period of time and activates the power-on reset pull-up signal during activation of the power-on reset signal.

14. The RFID tag according to claim 3, wherein the short-term memory comprises:
a second power-on reset control unit outputting a power-on reset control signal and a power-on reset pull-up signal when the power-on reset signal is inactive;
a second persistent time control unit outputting a plate signal for storing and restoring the flag data, and outputting a delayed write signal for controlling a time when the flag data is stored according to the power-on reset control signal and the short-term data write signal;
a second short-term data control unit converting the flag data according to the delayed write signal and outputting a delayed data signal;
a second data storing and amplifying unit storing the flag data according to the delayed data signal, the delayed write signal, and the plate signal during activation of the short-term data write signal, and amplifying and outputting the stored flag data according to the plate signal and the power-on reset pull-up signal during activation of the power-on reset signal; and
a latch output unit latching an output signal of the second data storing and amplifying unit and outputting the output signal of the second data storing and amplifying unit to the digital block.

15. The RFID tag according to claim 14, wherein the second persistent time control unit comprises:
a second short-term write delay unit delaying and inverting the short-term data write signal and outputting the delayed write signal; and
a second storing and restoring control unit activating the plate signal during activation of the short-term data write signal or the power-on reset control signal.

16. The RFID tag according to claim 15, wherein the second short-term write delay unit comprises:
a second pull-up delay driving unit inverting and pulling up the short-term data write signal;
a second delay driving unit inverting an output signal of the second pull-up delay driving unit;
a third delay driving unit inverting the output signal of the second delay driving unit and outputting the delayed write signal;
a second pull-up delay capacity unit delaying the output signal of the second pull-up delay driving unit for a given period of time and outputting the output signal of the second pull-up delay driving unit to the second delay driving unit; and a second delay capacity unit delaying the output signal of the second delay driving unit for a given period of time and outputting the output signal of the second delay driving unit to the third delay driving unit.

17. The RFID tag according to claim 14, wherein the second short-term data control unit converts the flag data so that the delayed data signal has a pulse width that is the same as a pulse width of the delayed write signal.

18. The RFID tag according to claim 14, wherein the second data storing and amplifying unit includes:

a second data storing unit storing the delayed data signal in a third ferroelectric capacitor according to the delayed write signal and the plate signal; and a second amplifying unit reading and amplifying data stored in the third ferroelectric capacitor according to the plate signal and the power-on reset pull-up signal and outputting the data stored in the third ferroelectric capacitor to the latch output unit.

19. The RFID tag according to claim 18, wherein the second data storing unit transmits the delayed data signal to the latch output unit while storing the delayed data signal.

20. The RFID tag according to claim 14, wherein the latch output unit latches a differential signal outputted from the second data storing and amplifying unit, and maintains an output state of the latched differential signal while the outputted differential signal of the second data storing and amplifying unit maintains the same level.

* * * * *